United States Patent
Al-Otoom et al.

(10) Patent No.: US 12,288,070 B1
(45) Date of Patent: Apr. 29, 2025

(54) PROGRAM COUNTER ZERO-CYCLE LOADS

(71) Applicant: Apple Inc., Cupertino, CA (US)

(72) Inventors: Muawya M. Al-Otoom, Lake Oswego, OR (US); Conrado Blasco, Sunnyvale, CA (US); Deepankar Duggal, Sunnyvale, CA (US); Ethan R. Schuchman, Saratoga, CA (US); Ian D. Kountanis, Santa Clara, CA (US); Kulin N. Kothari, Cupertino, CA (US); Nikhil Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 17/931,070

(22) Filed: Sep. 9, 2022

(51) Int. Cl.
  *G06F 9/30* (2018.01)
  *G06F 9/38* (2018.01)

(52) U.S. Cl.
  CPC ........ *G06F 9/3016* (2013.01); *G06F 9/30043* (2013.01); *G06F 9/3826* (2013.01)

(58) Field of Classification Search
  CPC .............. G06F 9/30043; G06F 9/3824; G06F 9/3826; G06F 9/3828; G06F 9/383; G06F 9/3832; G06F 9/3834; G06F 9/3838; G06F 9/3842
  See application file for complete search history.

(56) References Cited

U.S. PATENT DOCUMENTS

| | | | |
|---|---|---|---|
| 6,694,424 B1 * | 2/2004 | Keller | G06F 9/3856 712/216 |
| 9,600,289 B2 * | 3/2017 | Meier | G06F 9/3834 |
| 10,838,729 B1 | 11/2020 | Al-Otoom et al. | |
| 12,079,126 B2 * | 9/2024 | Favor | G06F 12/0855 |
| 12,086,591 B2 * | 9/2024 | Shukla | G06F 9/3856 |
| 2006/0095734 A1 * | 5/2006 | Filippo | G06F 9/3826 712/E9.046 |
| 2007/0130448 A1 | 6/2007 | Jourdan et al. | |
| 2013/0298127 A1 * | 11/2013 | Meier | G06F 9/3842 718/100 |
| 2013/0339671 A1 * | 12/2013 | Williams, III | G06F 9/3838 712/E9.023 |
| 2014/0379986 A1 | 12/2014 | Troester et al. | |

\* cited by examiner

*Primary Examiner* — Andrew Caldwell
*Assistant Examiner* — Kasim Alli
(74) *Attorney, Agent, or Firm* — Kowert, Hood, Munyon, Rankin & Goetzel, P.C.; Scott W. Pape; Dean M. Munyon

(57) ABSTRACT

An apparatus includes a processor core that includes an instruction decode circuit and a control circuit. The instruction decode circuit is configured to decode instructions, including a plurality of store instructions used to store information in a memory hierarchy. The control circuit is configured, after a particular store instruction is decoded, to preserve store information related to the particular store instruction, including a first program counter value for the particular store instruction. In response to decoding a subsequent load instruction with a corresponding second program counter value, the control circuit is configured to determine, using the first and second program counter values, whether a dependency has been established between the subsequent load instruction and the particular store instruction. In response to a determination that the dependency has been established, the control circuit is configured to use the preserved store information to perform the subsequent load instruction.

19 Claims, 10 Drawing Sheets

*300*

```
┌─────────────────────────────────────────────────────────────┐
│  Decoding, by a processor core, a particular store          │
│  instruction for storing information in a memory hierarchy. │
│                         310                                  │
└─────────────────────────────────────────────────────────────┘
                              │
                              ▼
┌─────────────────────────────────────────────────────────────┐
│  Preserving, in a particular entry of a store-load          │
│  dependency (SLD) prediction circuit, information related   │
│  to the particular store instruction, wherein the           │
│  information includes a first program counter value         │
│  corresponding to the particular store instruction.         │
│                         320                                  │
└─────────────────────────────────────────────────────────────┘
                              │
                              ▼
┌─────────────────────────────────────────────────────────────┐
│  Decoding, after the preserving, a particular load          │
│  instruction for retrieving information from the memory     │
│  hierarchy.                                                 │
│                         330                                  │
└─────────────────────────────────────────────────────────────┘
                              │
                              ▼
┌─────────────────────────────────────────────────────────────┐
│  Determining whether a dependency has been established      │
│  between the particular load instruction and the particular │
│  store instruction, wherein the dependency is based on a    │
│  second program counter value corresponding to the          │
│  particular load instruction and the first program counter  │
│  value from the particular entry.                           │
│                         340                                  │
└─────────────────────────────────────────────────────────────┘
```

```
Decoding a particular store instruction before a dependency has been
established in a particular entry of the SLD prediction circuit.
510
```

```
In response to determining that the dependency has been established,
using the preserved information to generate a corresponding entry in a
store-load dependency (SLD) mapper circuit.
520
```

```
Using the preserved information in the entry in the SLD mapper circuit to
perform the particular load instruction.
530
```

FIG. 5

PROGRAM COUNTER ZERO-CYCLE LOADS

BACKGROUND

Technical Field

Embodiments described herein are related to computing systems, including systems-on-a-chip (SoCs). More particularly, embodiments are disclosed to techniques for enabling zero-cycle loads in a processor circuit.

Description of the Related Art

Storing and loading information to and from memory circuits is a common occurrence for processor cores. Store instructions are used to write information to a memory circuit for potential use at a later time. Load instructions are used to retrieve previously written information form the memory circuit. A processor core may take multiple processor cycles to complete a store instruction. For example, a store to a dynamic random-access memory (DRAM) that is external to the processor core may require tens of cycles or more as performing the store may include use of a memory controller circuit that is separate from the processor core. Cache circuits may be used to reduce a time to access information in such cases, but even storing information to a local cache circuit may consume several processor cycles. Reading this stored information may further consume several cycles or more depending if the desired information is in a local cache or must be read from DRAM.

Due to the time consumed writing and reading information, a processor core may use store and load instruction queues. These queues may allow for a plurality of store and load instructions to be decoded and ready to perform as core resources permit. For example, after completion of a given store instruction, a next store instruction in the store queue may be performed. Depending on a current workload of the processor core, store instructions may remain in a store instruction queue for tens, hundreds or more, processor cycles. The processor core may continue to execute instructions fetched after queued store instructions. A subsequent load instruction may access information that is to be written by a queued store instruction. In some cases, this may result in a stall of further program execution until the store instruction proceeds through the queue and is eventually performed. After the store instruction has written the information to the memory circuit (e.g., DRAM, cache, or similar), the paired load instruction may then be performed, reading the information that has been written.

BRIEF DESCRIPTION OF THE DRAWINGS

The following detailed description makes reference to the accompanying drawings, which are now briefly described.

FIG. 3 depicts a flow diagram of an embodiment of a method for preserving information related to a store instruction for later use by a load instruction.

FIG. 5 shows a flow diagram of an embodiment of a method for using preserved information related to a store instruction to fulfill a subsequent load instruction after a dependency has been determined.

Figure 1:
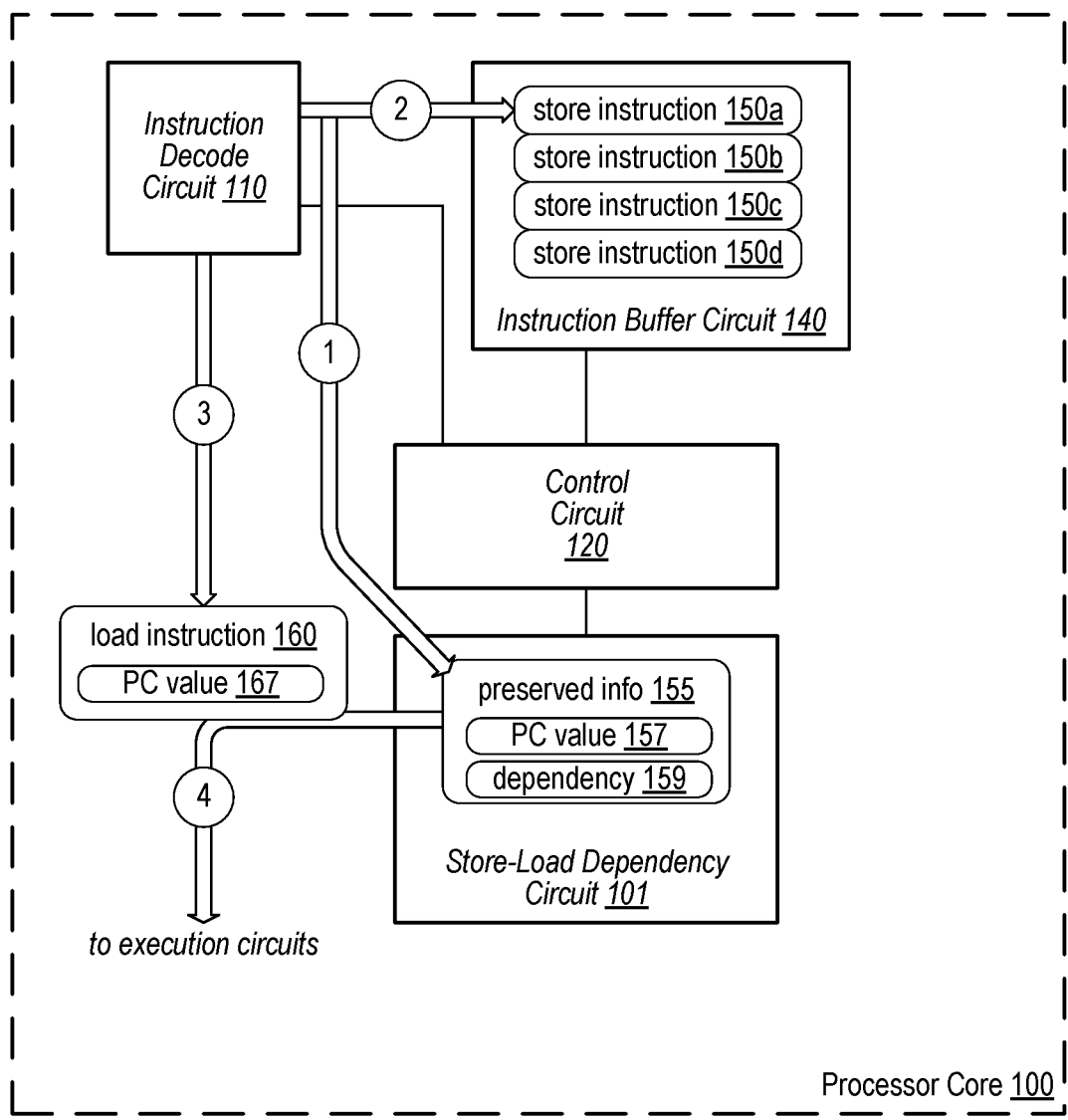
FIG. 1 illustrates a block diagram of an embodiment of a processor core that includes store-load dependency circuit, a control circuit, and an instruction buffer circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

One technique for increasing performance of a CPU is to utilize zero-cycle loads (ZCL). ZCLs provide a short cut for performing a load instruction. Certain types of store-load instruction pairs may be identified in the instruction code. For example, a given store instruction may identify a particular architectural register that holds a destination address to which data is to be written. A subsequent load instruction may identify the same architectural register to indicate a source address from which to read information. If the processor core can determine that the value of architectural register does not change between the store and load instructions, then these load and store instructions may be identified as a store-load pair. A physical register may be assigned to the store instruction, the physical register holding data that will be written to the identified address. After a store-load pair is identified, then this physical register with the store data may be reassigned as the result of the load instruction, thereby completing the load instruction in effectively zero cycles as the result may be used by a subsequent instruction that is a consumer of the load instruction.

A "store-load pair" refers to a load instruction that reads information from a particular memory address to which the paired store instruction wrote the information. If the paired load instruction is decoded and ready to launch before the store instruction issues, then a zero-cycle load may be performed by using relevant information from the queued store instruction, e.g., by reassigning the physical register that holds the data for the store instruction. This relevant information may be used to speculatively fulfill the paired load instruction without waiting for the paired store instruction to be performed.

Since this ZCL technique utilizes a store instruction queue for temporarily holding store instruction information until a paired load instruction is ready to launch, a distance between the store instruction and the subsequent load instruction may be limited to a particular number of instructions. As used herein, a "distance" between instructions refers to a number of instructions performed between a store instruction and a paired load instruction. It is noted that a number of instructions performed between the store and load instructions may be different than a number of instructions between the store and load instructions in program code. For example, ten instructions may be included between a store and load instruction pair, but a branch instruction may create a loop that is performed several times, resulting in fifty instructions being performed between the performance of the store instruction and the performance of the load instruction. In other embodiments, a branch instruction may skip several instructions such that only two instructions are performed between the store and load instructions.

In some cases, the distance may be far, for example, hundreds or thousands or more instructions being fetched in between the store and load instructions. In other cases, this distance may be short, e.g., tens or even fewer instructions between the pair. A large distance between a store-load pair may result in a different instruction modifying the information stored at the memory address, thereby making a link between the store and load instructions irrelevant and preventing effective use of ZCL techniques. If, however, this distance satisfies a determined threshold distance, then a link between a pair of load and store instructions may be identified and ZCL techniques may be used for the store-load pair.

One particular type of ZCL technique that may be employed is a zero-cycle load for stack pointer pushes and pulls (ZCL-SP). Stack pushes may frequently be followed by a stack pull within a satisfactory distance, allowing a pairing to be made between the store instruction associated with the stack push and the load instruction associated with the stack pull. Accordingly, stack pushes and pulls may be good candidates for establishing store-load pairs as a stack pull may occur shortly after a stack push. Another type of ZCL technique is a zero-cycle load for register file matches (ZCL-RF). A destination address (e.g., a memory address to which data will be written) for a store instruction may be held in an architectural register. A paired load instruction may indicate the same architectural register as a source address (e.g., a memory address from which data will be read). A store-load pair may be determined by matching the respective destination and source registers. To fulfill a load instruction using a ZCL-SP or ZCL-RF operation, a physical register allocated to the data operand of the store instruction (e.g., the data to be stored) is also assigned to the result of the load instruction. A subsequent instruction that consumes the result of the load instruction may be performed after the assignment, if other operands of the subsequent instruction are ready.

Circuitry for implementing ZCL-SP and ZCL-RF operations within a processor core may be relatively small in comparison to circuitry for an entire core and, therefore, may be included without significant impact to core size. Other types of store-load pairs, however, may be included in various examples of program code that cannot be performed using the ZCL-SP or ZCL-RF operations. Accordingly, to increase a number of store-load pairs that can be performed using bandwidth saving ZCL techniques, other types of ZCL operations are desired.

The present disclosure considers novel digital circuits for use in processor cores to identify store-load pairs that cannot be performed using the ZCL-SP or ZCL-RF operations. For example, a processor circuit may include a processor core that includes a store queue circuit that is configured to buffer information related to ones of a plurality of decoded store instructions used to store information in a memory hierarchy. The processor circuit may also include a control circuit that is configured to, after a particular store instruction is buffered in the store queue circuit, preserve store information related to the particular store instruction. This preserved store information may include a first program counter value corresponding to the particular store instruction. The control circuit may be further configured, in response to a decoding of a subsequent load instruction, to determine whether a dependency has been established between the subsequent load instruction and the particular store instruction. This determination may be based on a second program counter value corresponding to the subsequent load instruction and the first program counter value. Additionally, the control circuit may be configured, in response to a determination that the dependency has been established, to use the preserved store information to perform the subsequent load instruction. Such a technique is referred to herein as a "program-counter based zero-cycle load" or "ZCL-PC" for brevity.

Use of ZCL-PC operations may increase a number of opportunities for using ZCL operations, thereby increasing an efficiency of a store-load execution circuit included in a processor core. Such efficiency increases may increase a bandwidth and lower power consumption of the processor core. Programs may, therefore, be executed with increased efficiency, thereby improving system performance observed by a user and/or increasing a number of programs that may executed concurrently.

FIG. 1 illustrates a block diagram of an embodiment of a processor core that supports zero-cycle load operations. As illustrated, processor core 100 performs store and load instructions. Processor core 100 includes store-load dependency circuit 101, instruction decode circuit 110, control circuit 120, and instruction buffer circuit 140. In some embodiments, processor core 100 may be implemented within a single integrated circuit. Processor core 100 may be a part of a computing system, such as a desktop or laptop computer, a smartphone, a tablet computer, a wearable smart device, or the like.

As illustrated, for example, instruction buffer circuit 140 may be configured to receive store instructions 150 from instruction decode circuit 110. Instruction decode circuit 110 may be configured to receive, decode, and schedule instructions to be performed in processor core 100, including store instructions 150 and load instruction 160. As part of instruction decoding, an operand of a given instruction may be identified and a determination made if the operand is available and ready to be used. For example, store instruction 150a may indicate a particular architectural register (not shown in FIG. 1) that holds data to be stored. Instruction decode circuit 110 may determine if preceding instructions that could modify the value of the architectural register have completed before indicating that store instruction 150a is ready to be performed. After being decoded, instructions may be scheduled for execution and placed in instruction buffer circuit 140 until a respective execution unit has available bandwidth to retrieve a next scheduled instruction.

Executions times for completing memory instructions may, in some embodiments, be longer than other types of instructions performed in processor core 100. In order to allow progress to be made for such other instructions, memory instructions for a store-load execution circuit may be buffered, thereby allowing other instructions that are not dependent on buffered memory instructions to progress. Instruction decode circuit 110, as shown, is configured to decode instructions to be processed by processor core 100, including store instructions 150a-150d (collectively 150) that may be used to store information in a memory hierarchy. Instruction decode circuit 110 may include a plurality of stages for decoding instructions, such as a reorder, a rename stage, a scheduling stage, and the like.

After store instructions 150 have been decoded, instruction decode circuit 110 may place them in instruction buffer circuit 140 in respective entries until a given one of store instructions 150 is issued in response to selection by a store-load execution circuit in processor core 100. In addition to elements of the decoded store instructions 150, the respective entries of instruction buffer circuit 140 may hold additional information associated with ones of store instructions 150, such as group identification values that may be used to identify a particular fetch group in which a respective store instruction 150 was held. In addition, the respective entries may indicate a physical register that is allocated to an indicated architectural register. The entries may further include a program counter value that indicates a memory address from which the respective store instruction 150 was fetched.

As illustrated, control circuit 120 is configured to, after a particular store instruction (e.g. store instruction 150*a*) is decoded in instruction decode circuit 110, preserve store information related to store instruction 150*a*. Preserved store information (info) 155 includes program counter (PC) value 157 corresponding to store instruction 150*a*. Control circuit 120 is configured to preserve store information related to store instruction 150*a* by storing preserved store information 155 in a particular entry in store-load dependency circuit 101. This entry further includes dependency 159 that provides an indication of a dependency between store instruction 150*a* and a subsequently-scheduled load instruction.

In various embodiments, control circuit 120 may be triggered by different stages of instruction decode circuit 110. For example, store instruction 150 being processed in one of the reorder, rename, or scheduling stages may trigger control circuit 120 to preserve the store information in store-load dependency circuit 101. In other embodiments, the trigger may come after the instruction decode, such as when an entry to instruction buffer circuit 140 is generated for store instruction 150*a*, or a different buffer circuit such as a store queue circuit (not shown).

In response to a decoding of a subsequent load instruction (e.g., load instruction 160), control circuit 120, as shown, is further configured to determine whether dependency 159 has been established between load instruction 160 and store instruction 150*a*. This determination may be based on program counter (PC) value 167 corresponding to load instruction 160 and PC value 157. For example, store-load dependency circuit 101 may be trained to identify dependencies between particular store instructions and subsequent load instructions. The entry in store-load dependency circuit 101, as shown, uses PC value 157 to identify store instruction 150*a*. Prior to determining a dependency between store instruction 150*a* and load instruction 160, control circuit 120 may detect that load instruction 160 includes a source address that corresponds to a destination address of store instruction 150*a*. In various embodiments, this detection may be made using memory locations indicated in each instruction, such as architectural registers, virtual addresses, physical addresses, physical registers, and the like. After this detection is made, then control circuit 120 may modify a value of dependency 159, e.g., incremented or decremented.

In response to a determination that dependency 159 has been established, control circuit 120 is configured to use preserved store information 155 to perform load instruction 160. When load instruction 160 is ready to be performed, control circuit 120 is configured to use PC value 167 as a reference into the entries of store-load dependency circuit 101. After dependency 159 is established, PC value 167 is linked to PC value 157, thereby indicating that store instruction 150*a* and load instruction 160 form a store-load pair. Preserved store information 155 includes an indication of a value of data that is stored. This indication may be a destination address, a register name, the data value itself, or any other suitable indication. For example, a physical register may be assigned to hold data to be stored by store instruction 150*a*. After the dependency between store instruction 150*a* and load instruction 160 is determined to be established, this physical register is assigned to the result of load instruction 160, ready to be used by a subsequent instruction that is a consumer of the result of load instruction 160. Using this indication, the data value used for store instruction 150 is reused to fulfill load instruction 160 without issuing a memory request to a memory hierarchy, effectively executing load instruction 160 using zero core cycles. Accordingly, use of memory resources may be spared, leaving additional bandwidth for other memory instructions. In addition, load instruction 160 may be fulfilled in less time than if a memory request were issued to retrieve the data value.

It is noted that processor core 100, as illustrated in FIG. 1, is merely an example. Processor core 100 has been simplified to highlight features relevant to this disclosure. Elements not used to describe the details of the disclosed concepts have been omitted. For example, processor core 100 may include various additional circuits that are not illustrated, such as one or more execution circuits, a store-load circuit, branch prediction circuits, and the like. In various embodiments, control circuit 120, instruction decode circuit 110, instruction buffer circuit 140, store-load dependency circuit 101 and other circuits of processor core 100 may be implemented using any suitable combination of sequential and combinatorial logic circuits. In addition, register and/or memory circuits, such as static random-access memory (SRAM) may be used in these circuits to temporarily hold information such as instructions, fetch parameters, and/or address values.

In the description of FIG. 1, a store-load dependency circuit is described as preserving information related to various store instructions in order to determine if program code includes a load instruction that can be paired to the store instruction. Training of the store-load prediction is mentioned. A more detailed example of how a store-load dependency circuit is trained and then utilized is depicted in FIGS. 2A-2C.

Figure 2A:
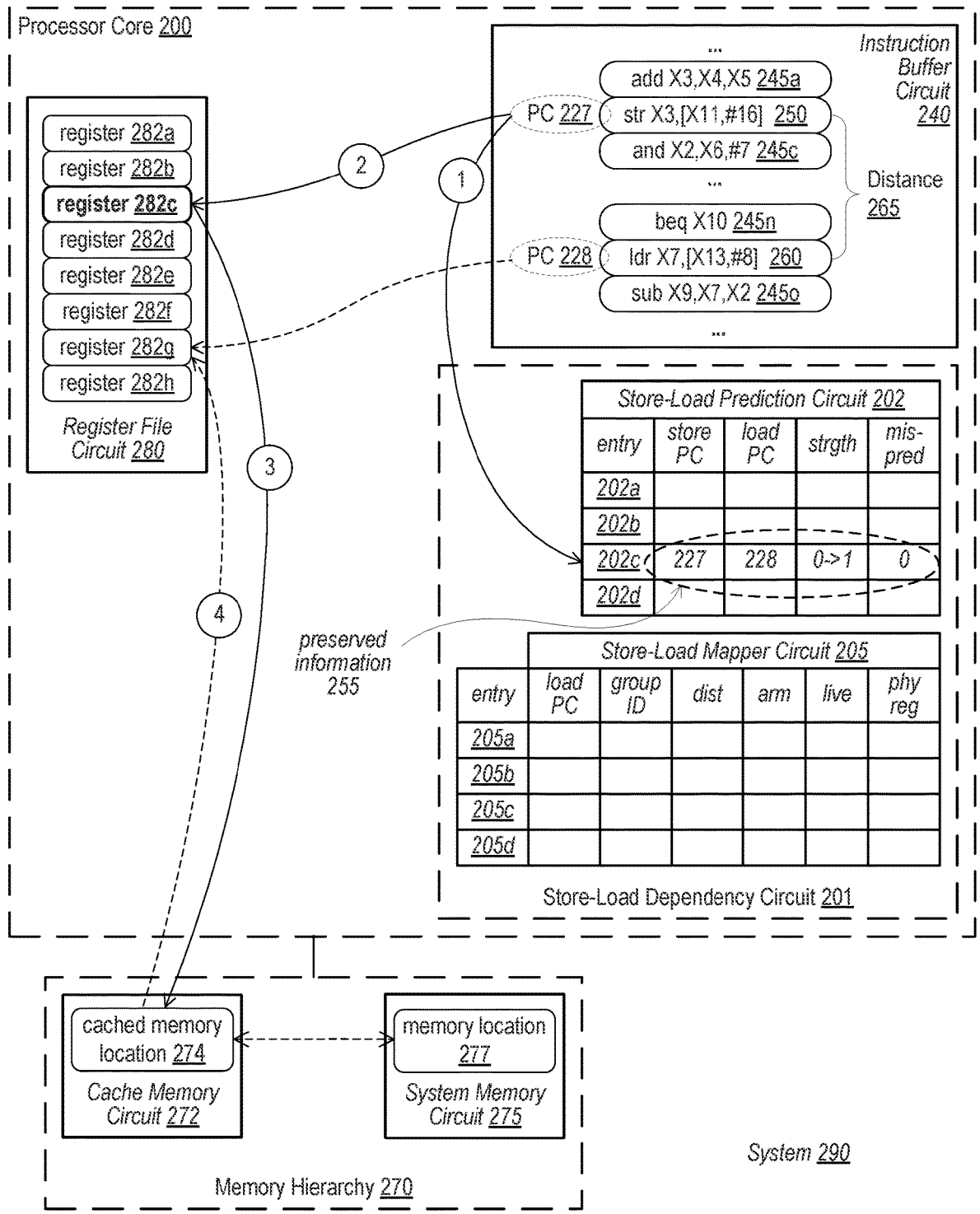
FIGS. 2A-2C show, at various points in time, a block diagram of an embodiment of a system that preserves information related to a store instruction being processed.
Figure 2B:
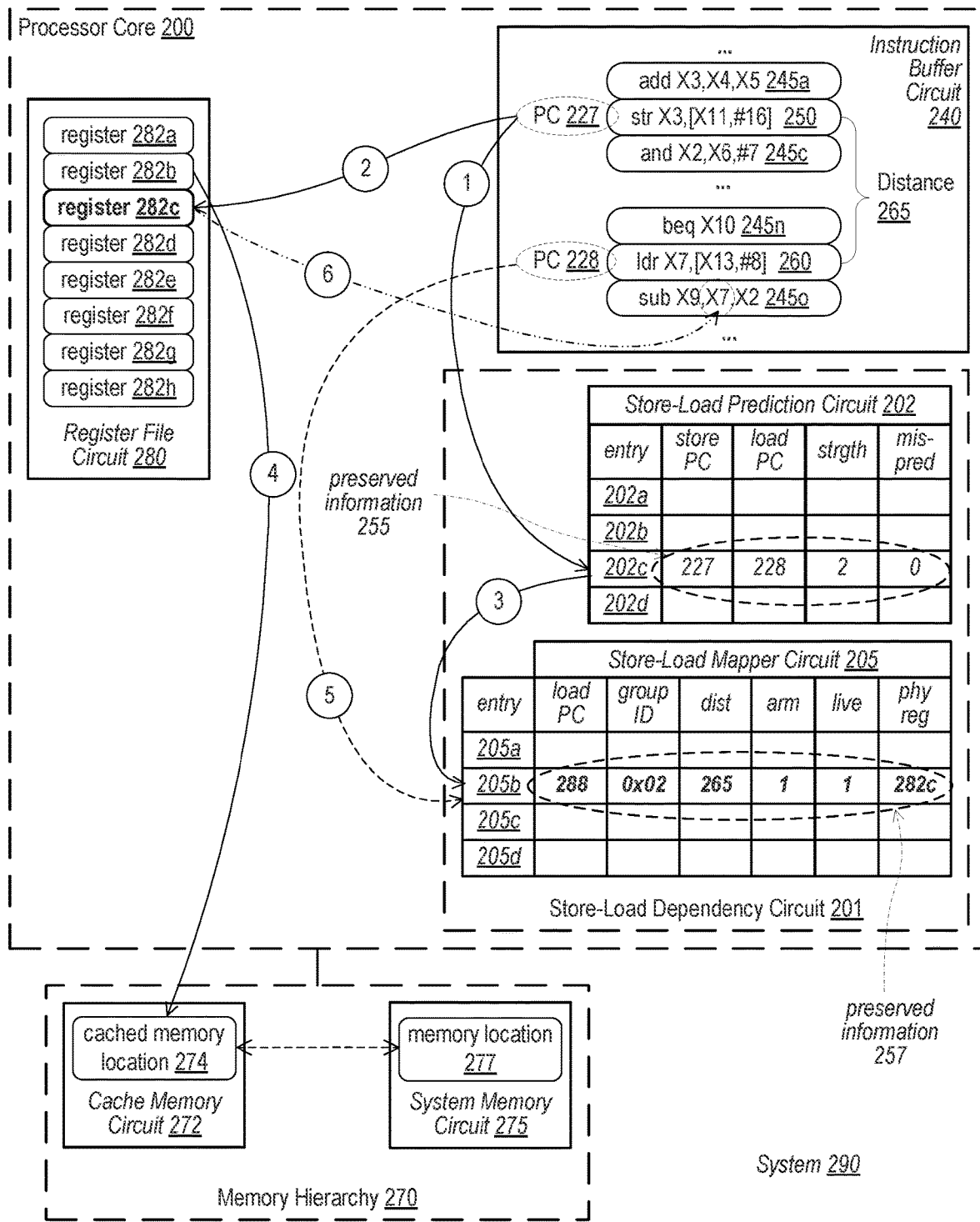
Figure 2C:
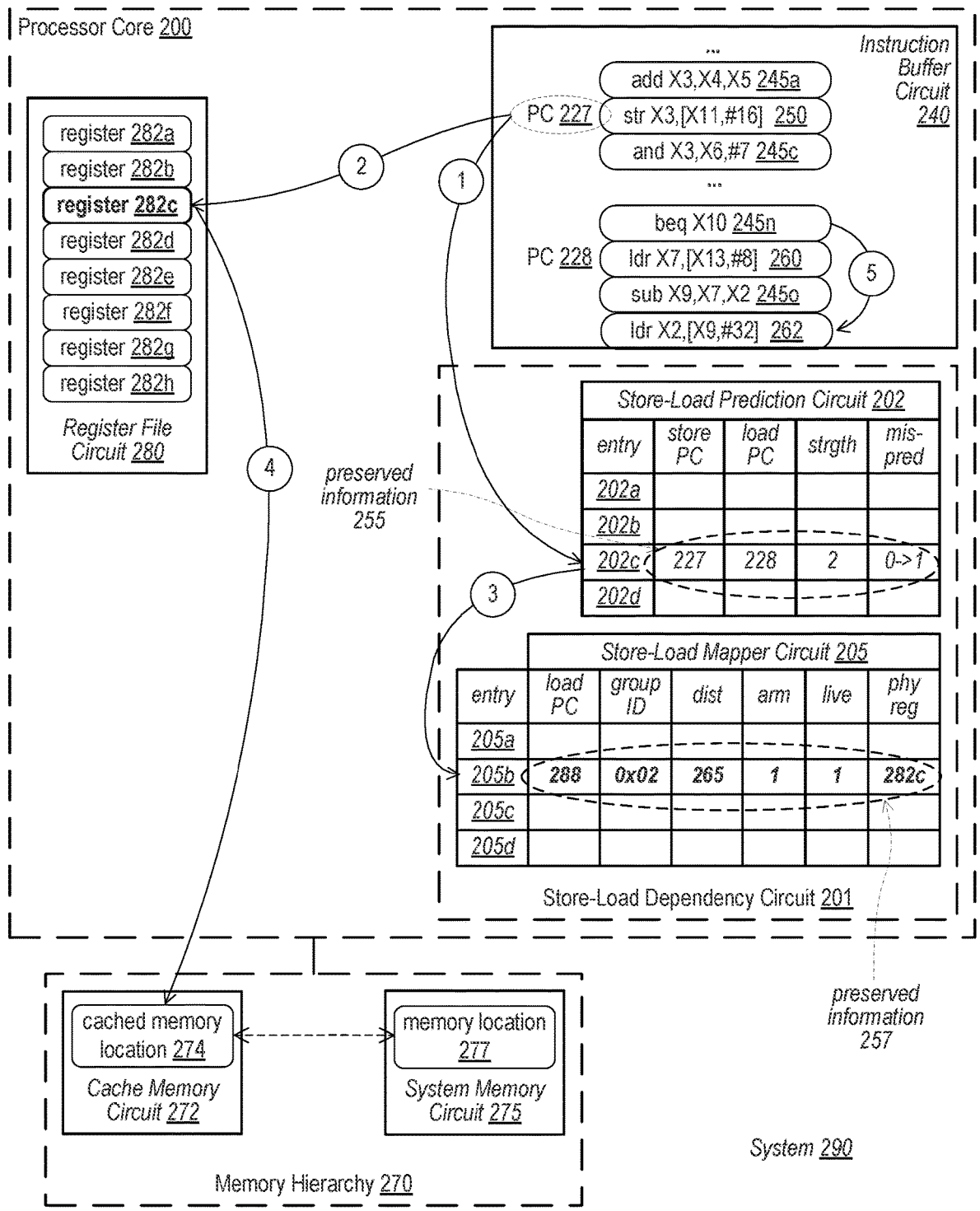

Moving to FIGS. 2A-2C, a block diagram of an embodiment of a system with a store-load dependency circuit is shown at several points in time. System 290 includes processor core 200 coupled to memory hierarchy 270. Processor core 200 includes store-load dependency circuit 201, instruction buffer circuit 240, and register file circuit 280. Store-load dependency circuit 201 includes store-load prediction circuit 202 and store-load mapper circuit 205. Register file circuit 280 includes physical registers 282*a*-282*h* (collectively, physical registers 282). Memory hierarchy 270 includes cache memory circuit 272 and system memory circuit 275. Elements of FIGS. 2A-2C may, in some embodiments, correspond to similarly named and numbered elements of FIG. 1. Processor core 200 may read and write information in memory hierarchy 270. Access times for completing memory requests to memory hierarchy 270 may require multiple core clock cycles to complete. Accordingly, store-load dependency circuit 201 may be used to perform ZCL operations in cases where a store-load dependency may be established.

As illustrated, processor core 200 is executing program code that includes various instructions 245*a*, 245*c*, 245*n*, 2450, store instruction (str) 250, and load instruction (ldr) 260. These instructions are decoded, scheduled, and buffered in instruction buffer circuit 240 until an associated execution circuit (including for example, an integer execution circuit, a floating-point co-processor circuit, a store-load execution circuit, and the like) is ready to execute the respective instruction.

Processor core 200, as shown, is configured to decode store instruction 250. During the decoding, information associated with store instruction 250, including a program counter value (PC 227), is placed into instruction buffer circuit 240. Instruction buffer circuit 240 is used by processor core 200 to buffer instructions until an appropriate execution circuit is available to perform the instruction.

Store-load dependency circuit 201, as depicted, is used to enable ZCL operations. For example, store-load dependency circuit 201 is trained to determine whether various store instructions meet requirements for a ZCL operation, such as whether a given store instruction can be paired to a particular load instruction and whether the particular load instruction is within a distance limit of the given store instruction. Store-load dependency circuit 201 includes store-load prediction circuit 202 which includes a table of information that may be trained to detect a dependency between a store instruction and a subsequent load instruction.

The example of store-load prediction circuit 202 shown in FIGS. 2A-2C includes four entries 202a-202d, each entry including four fields. These fields include a program counter value (store PC) for a corresponding store instruction, and a program counter value (load PC) for a subsequent load instruction that may or may not be pairable to the store instruction. Store PC and load PC may include all or a portion of a program counter value indicating a memory location of the respective store and load instructions. Other fields include two status fields, strength count (strgth) and misprediction count (mis-pred). Strength count is incremented when the load instruction at load PC is determined to be dependent on the store instruction at store PC. Misprediction count is incremented when the load instruction at load PC is determined not to use the value stored by the store instruction at store PC. In other embodiments, additional or different fields may be included. For example, in some embodiments, a distance field may be included to track a distance between a store-load pair. Furthermore, in some embodiments a branch history pattern may be tracked for conditional branch instructions that are performed between execution of a store instruction and a paired load instruction.

Instructions stored in instruction buffer circuit 240 may be used as an example of training store-load dependency circuit 201. Add instruction 245a adds the contents of architectural registers X4 and X5, placing the result in architectural register X3. Store instruction 250 stores the contents of X3 to a memory location determined by contents of architectural register X11 offset by a value of sixteen. And instruction 245c and branch if equal (beq) instruction 245n are two of a plurality of instructions between store instruction 250 and load (ldr) instruction 260. Load instruction 260 reads a memory location determined by contents of architectural register X13 offset by a value of eight, and places the result in architectural register X7. Subtract (sub) instruction 2450 subtracts a data value in architectural register X2 from the result of load instruction 260, architectural register X7. The result of the subtract instruction in placed in architectural register X9.

As shown in FIG. 2A, processor core 200, in response to an initial decoding of store instruction 250, is configured to preserve, in entry 202c of store-load prediction circuit 202, information (preserved information 255) related to store instruction 250. PC 227 (or a portion thereof) is used to access a particular entry in store-load prediction circuit 202 (e.g., entry 202c). For example, a hash code may be determined using some or all of PC 227 to generate a tag value for accessing store-load prediction circuit 202. PC 227, therefore, may be associated with a single entry in store-load prediction circuit 202. Preserved information 255, as shown, includes PC 227, which corresponds to store instruction 250. As this is the first fetch of store instruction 250 (e.g., a first fetch since a store-load dependency circuit 201 has been reset), strength count and misprediction count may be cleared to an initial value, such as zero.

In some embodiments, processor core 200 may be further configured to determine that store instruction 250 is not a stack push instruction in order to preserve the information related to store instruction 250 in entry 202c of store-load prediction circuit 202. In such embodiments, processor core 200 may also be configured to determine that store instruction 250 does not indicate a same architectural register as load instruction 260 in order to preserve the information related to store instruction 250 in entry 202c. For example, processor core 200 may include one or more other store-load dependency circuits (not shown) for identifying particular types of store-load pairs. Stack pointer store and load instructions may be identified without training, as stack instructions may be identifiable after a decode stage. A load instruction intervening between a stack store and a subsequent stack load may, therefore, be identified as not being paired with the stack store, allowing information associated with the stack store to be preserved until a subsequent stack load is decoded. Similarly, non-stack store and load instructions that indicate a same architectural register may be identified without training, as the architectural register is indicated within the store and load instructions. Accordingly, such store-load pairs that may be detected without training may be identified using other dependency circuits.

Returning to the example of FIG. 2A, processor core 200 is configured to decode load instruction 260 after preserved information 255 has been preserved in entry 202c. In a similar manner as store instruction 250, this may be a first fetch of load instruction 260 since a most recent reset of store-load dependency circuit 201. Processor core 200 is further configured to determine whether a dependency has been established between load instruction 260 and store instruction 250 using a value of load PC in entry 202c and a program counter value corresponding to the particular load instruction (PC 228). In some embodiments, processor core 200 may be configured to first determine whether an entry in store-load mapper circuit 205 has been generated. In such embodiments, PC 228 may be used (e.g., by generating a hash code using some or all of PC 228) to access a particular entry in store-load mapper circuit 205. In other embodiments, PC 228 may be compared to the load PC field for some or all of entries 205a-205d to determine if a match exist.

In the current example, a dependency has not yet been determined, so no entry in store-load mapper circuit 205 exist for load instruction 260. Processor core 200 may, therefore, determine if an entry in store-load prediction circuit 202 includes a reference to PC 228. As this is a first fetch of load instruction 260 since entry 202c has been generated, the load PC field for entry 202c may have a default value indicating this field has not yet been given a valid value. Distance 265 between store instruction 250 and load instruction 260 may be determined, e.g., using the group ID values within instruction buffer circuit 240 that are associated with store instruction 250 and load instruction 260.

In response to determining that distance 265 satisfies a distance limit for using store-load dependency circuit 201, processor core 200 is configured to link load instruction 260 to store instruction 250 by adding PC 228 to the load PC field of entry 202c. This linking, however, does not establish a dependency between load instruction 260 and store instruction 250, merely a possibility that a dependency may exists. In response to a determination that a dependency has not been established, processor core 200 is further configured to perform load instruction 260 using memory hierarchy 270. Physical register 282g is allocated to hold a value read from memory hierarchy 270 as a result of performing load instruction 260. Processor core 200 is configured to determine if a target address indicated by load instruction 260 is currently valid or if a buffered store instruction is scheduled to write to the same target address. If store instruction 250 has been performed, then load instruction 260 may be performed. Otherwise, load instruction 260 may be buffered, e.g., in a load instruction buffer in processor core 200 (not shown), until a value corresponding to the target address has been written into memory hierarchy 270.

As illustrated, processor core 200 determines whether load instruction 260 retrieves data from a source location in memory hierarchy 270 that corresponds to a destination location to which store instruction 250 wrote data. For example, store instruction 250 may cause a value to be stored in cache memory circuit 272 at cached memory location 274 and/or memory location 277 in system memory circuit 275. If the source location for load instruction 260 corresponds to memory location 277, then the source and destination locations match. In response to a determination that the source and destination locations match, processor core 200 is configured to adjust, in entry 202c, the strength count field of entry 202c as an indication of a strength of the dependency.

The program code segment shown in instruction buffer circuit 240 may be fetched and performed more than once. Each repeat of this code segment may result in a reaffirmation of the dependency between store instruction 250 and load instruction 260, resulting in an increase in the strength count of entry 202c for each reaffirmation. In various embodiments, a suitable threshold value of the strength field may be used to establish the dependency. As depicted, a strength count of 2, without any mispredictions, may be the threshold to establish the dependency between store instruction 250 and load instruction 260.

FIG. 2B illustrates a second point in time after FIG. 2A. In FIG. 2B, the segment of program code repeats again, and store instruction 250 is fetched after the strength field of entry 202c has satisfied the threshold value. Processor core 200 is further configured, in response to another decoding of store instruction 250 after the strength threshold has been satisfied, to use preserved information 255 from entry 202c of store-load prediction circuit 202 to generate a corresponding entry 205b in store-load mapper circuit 205. Preserved information 257 is stored in entry 205b. In addition, the live indication in entry 202c is set to indicate that the corresponding entry 205b has been generated.

As disclosed above, in some embodiments, a branch history of one or more conditional branch instructions, such as beq instruction 245n, may be included in entry 202c of store-load prediction circuit 202. In such embodiments, if the tracked branch history suggests that beq instruction 245n will be taken in the current iteration of the segment of program code, then entry 205b may not be generated. Taking of this branch would skip execution of load instruction 260. By skipping the generation of entry 205b for load instruction 260 when load instruction 260 may not be performed, entry 205b may remain available for use by a different store-load pair.

Store-load mapper circuit 205, as depicted, includes four entries, each entry having six fields. The load PC field includes a program counter value for a load instruction associated with a given generated entry. The group ID is the group ID number associated with the paired store instruction from which the associated load instruction depends. A distance value (dist) indicates a distance between the paired store instruction and the dependent load instruction. The arm and live indications signal that the paired store instruction (store instruction 250) has been decoded, and has not yet been issued (arm indication) and has not been retired (live indicator) and, therefore, entry 205b is ready to be used for a ZCL operation. In some embodiments, only the live indication or the arm indication may be implemented. The phy reg field indicates a physical register 282 that is assigned to the paired store instruction, in this example, physical register 282c.

As illustrated, store-load mapper circuit 205 is used to provide information that may be used to perform a ZCL operation to fulfill an expected instance of load instruction 260. The establishment of the dependency indicates that after store instruction 250 is fetched, load instruction 260 will subsequently be fetched and meet requirements for use of a ZCL operation. Entry 205b may be selected using all or a portion of PC 228 of load instruction 260. It is noted that the program counter value of load instruction 260 is used to identify an entry in store-load mapper circuit 205, whereas the program counter value of store instruction 250 is used to identify an entry in store-load prediction circuit 202. Decoding of store instruction 250 results in an access to store-load prediction circuit 202 to determine whether a dependency has been established for store instruction 250. If the dependency is established, then entry 205b is generated. Subsequent decoding of load instruction 260 results in an access to store-load mapper circuit 205 to determine whether entry 205b has been generated.

Processor core 200, as shown, is further configured, in response to the decoding of load instruction 260 after entry 205b has been generated, to use preserved information 257 from entry 205b to perform load instruction 260. Processor core 200 accesses store-load mapper circuit 205, using PC 228 to select entry 205b. Processor core 200 determines that the load PC value in entry 205b corresponds to load instruction 260, thereby enabling preserved information 257 to be used to perform a ZCL operation for fulfilling load instruction 260. The group ID number may be used to identify store instruction 250 to further determine whether store instruction 250 has been performed. In embodiments in which a distance value is tracked in entry 202c, the distance field of entry 205b may be compared to the distance value tracked in entry 202c. If the two distance values match, then the dependency of load instruction 260 to store instruction 250 may be confirmed and the ZCL operation performed. Otherwise, in the case of a mismatch, the ZCL operation may be skipped and load instruction 260 performed via a memory request to memory hierarchy 270.

As shown, processor core 200 is further configured, in response to the arm indication of entry 205b being set, to assign physical register 282c to the result of load instruction 260. In some embodiments, processor core 200 may instead assign physical register 282c to an instruction that is a consumer of a result of load instruction 260, for example, subtract instruction 2450. This assignment of physical register 282c may result in zero core cycles effectively being used to perform load instruction 260, enabling execution of subtract instruction 2450 to begin after a value in architectural register X2 is determined to be valid.

In FIG. 2C, a third point in time after FIG. 2B is shown. In FIG. 2C, the segment of program code repeats again, and store instruction 250 is fetched another time after the strength threshold has been satisfied in entry 202c. In a similar manner as shown in FIG. 2B, processor core 200 is configured, in response to the additional decoding of store instruction 250, to use preserved information 255 from entry 202c of store-load prediction circuit 202 to generate a corresponding entry 205b in store-load mapper circuit 205.

As illustrated, decoded instructions in instruction buffer circuit 240 include beq instruction 245n that comes before load instruction 260, and load instruction 262 that comes after load instruction 260. Beq instruction 245n is a type of control transfer instruction in which a program flow is transferred (e.g., a branch is taken) in response to a particular condition being satisfied (two compared values being equal to one another). Beq instruction 245n may have been decoded in the prior iterations of the program code segment. In these prior iterations, however, the condition for taking the branch was not have been satisfied, resulting in load instruction 260 being executed. In FIG. 2C, however, the condition is satisfied, and program flow branches past load instruction 260 and instead proceeds to load instruction 262.

Processor core 200, as shown, is further configured to determine that the predicted dependency of load instruction 260 on store instruction 250 results in a mispredicted dependency. For example, processor core 200 may determine that load instruction 262 is, in the current iteration of the program code segment, associated with store instruction 250. Load instruction 262 may read a same source location as load instruction 260. In response to this determination of a misprediction, processor core 200 may be configured to increment the misprediction count in entry 202c in store-load prediction circuit 202. In response to determining that the misprediction count satisfies a threshold value, processor core 200 may evict the current values preserved in entry 202c, thereby enabling a different store instruction whose program counter value corresponds to the same entry 202c to use entry 202c. In some embodiments, for example, the threshold value may be "1" resulting in a single misprediction causing an eviction from the entry.

In some embodiments, processor core 200 may be configured to set an indication in a store-load misprediction table. Such an indication may identify load instruction 260 and store instruction 250. For example, a Bloom filter that is indexed using hash operations on both PC 227 and PC 228 may be used to set a mispredicted pair indication. In such embodiments, processor core 200 may be further configured, in response to a subsequent fetch of store instruction 250, to prevent preserving, in store-load prediction circuit 202, preservation information 255 related to store instruction 250. Use of such a misprediction table may prevent a store-load pair that is only valid for some iterations of program execution from being preserved. As a misprediction may result in a flush of an execution pipeline of processor core 200, including for example, instruction buffer circuit 240, it may be desirable to avoid store-load pairs that result in mispredictions.

As an additional precaution against mispredictions, processor core 200 may be further configured, in response to the determination of a misprediction, increment a global misprediction count value. A global misprediction value may be incremented in response to any misprediction associated with store-load prediction circuit 202, regardless of associated program counter values. In response to a determination that the global misprediction count value satisfies a threshold count value, processor core 200 may be configured to disable store-load dependency circuit 201, including store-load prediction circuit 202. A global misprediction count may indicate consistent mispredictions even if the various mispredictions are associated with different store-load pairs. Since mispredictions may result in many wasted core cycles, processor core 200 may increase performance if store-load dependency circuit 201 is disabled due to a plurality of mispredictions. In some embodiments, store-load dependency circuit 201 may be enabled again after a particular number of core cycles have occurred or a particular number of instructions have been executed.

In some embodiments, it is contemplated that two load instructions may be paired with a same store instruction. In the current example, rather than resulting in a misprediction, both load instruction 260 and load instruction 262 may be paired with store instruction 250 as long as requirements for the pairing are satisfied. In such embodiments, two entries in store-load prediction circuit 202 may be generated. In FIG. 2C, a second entry in store-load prediction circuit 202 may be added in response to taking the branch at beq instruction 245n and reaching load instruction 262. The link between load instruction 262 and store instruction 250 may be trained using the techniques disclosed in regards to FIG. 2A.

It is noted that the examples shown in FIGS. 2A-2C are associated with one depiction of a processor core with a store-load dependency circuit. Other embodiments, may include a different combination of circuit elements, including additional circuits. In some embodiments, for example, additional circuits may include a load queue circuit, a decoder circuit, one or more execution units and the like. As disclosed, the arm and live indications are cleared using binary values of "0." In other embodiments, polarity of such indications may be reversed. These indications may also include more than a single bit of information, providing, for example, a range of indications. In the illustrated embodiments, certain actions are attributed to processor core 200. In other embodiments, some or all of these actions may be performed by a control circuit, such as control circuit 120 in FIG. 1.

To summarize, various embodiments of a system that identifies dependencies between store and load instructions are disclosed. Broadly speaking, apparatus, systems, and methods are contemplated in which an embodiment of an apparatus, for example, includes a processor core that includes An instruction decode circuit and a control circuit. The instruction decode circuit may be configured to instructions, including a plurality of store instructions used to store information in a memory hierarchy. The control circuit may be configured, after a particular store instruction is decoded by the instruction decode circuit, to preserve store information related to the particular store instruction. The preserved store information may include a first program counter value corresponding to the particular store instruction. In response to a decoding of a subsequent load instruction, the control circuit may be configured to determine whether a dependency has been established between the subsequent load instruction and the particular store instruction. This determination may be based on a second program counter value corresponding to the subsequent load instruction and the first program counter value. In response to a determination that the dependency has been established, the control circuit may be configured to use the preserved store information to perform the subsequent load instruction.

In a further example, the processor core may further include a store-load dependency (SLD) prediction circuit. The control circuit may be further configured to preserve the store information related to the particular store instruction by storing the preserved store information in a particular entry in the SLD prediction circuit.

In another example, the control circuit may be further configured, in response to a determination that the dependency has not been established, to perform the subsequent load instruction using the memory hierarchy, and to determine whether the subsequent load instruction retrieves data from a source location in the memory hierarchy that corresponds to a destination location to which the particular store instruction wrote data. In response to a determination that the source and destination locations match, the control circuit may be further configured to adjust, in the particular entry, an indication of the dependency.

In an example, the control circuit may be further configured to set an arm indication in the particular entry in response to another decoding of the particular store instruction. In another example, the processor core may further include a store-load dependency (SLD) mapper circuit. The control circuit may be further configured, in response to another decoding of the particular store instruction after the arm indication has been set, to use the preserved store information from the particular entry of the SLD prediction circuit to generate a corresponding entry in the SLD mapper circuit.

In a further example, the control circuit may be further configured, in response to another decoding of the subsequent load instruction after the corresponding entry has been generated, to use the preserved store information from the corresponding entry to perform the subsequent load instruction. In an example, the control circuit may be further configured, in response to a determination that a different load instruction is associated with the particular store instruction, to increment a misprediction count in the particular entry in the SLD prediction circuit.

In another example, the processor core may further include a plurality of physical registers. The control circuit may be further configured to assign a physical register from the particular store instruction to an instruction that is a consumer of a result of the subsequent load instruction.

The circuits and techniques described above in regards to FIGS. 1-2C may be performed using a variety of methods. Four methods associated with determining store-load dependencies are described below in regards to FIGS. 3-6.

Turning now to FIG. 3, a flow diagram for an embodiment of a method for determining whether a dependency has been established between a store instruction and a load instruction is illustrated. Method 300 may be used in conjunction with any of the computer circuitry, systems, devices, elements, or components disclosed herein, such as processor cores 100 and 200, among others. Method 300 is described below using processor core 100 of FIG. 1 as an example. References to elements in FIG. 1 are included as non-limiting examples.

As illustrated, method 300 begins in block 310 by decoding, by a processor core, a particular store instruction for storing information in a memory hierarchy. After being fetched, instructions to be executed in the processor core (e.g., processor core 100) are decoded and scheduled for execution and placed into a buffer, such as instruction buffer circuit 140. Since memory instructions, and in particular memory store instructions, may take longer to complete than other types of instructions, store instructions 150 scheduled for a store-load execution circuit may, in some embodiments, be further buffered in a store queue circuit to allow other instructions in instruction buffer circuit 140 to progress if they are not dependent on the buffered store instructions. Store instructions 150 may be buffered in respective entries instruction buffer circuit 140 until a given one of store instructions 150 is released in response to selection by a store-load execution circuit in processor core 100. The respective entries of instruction buffer circuit 140 may include additional information associated with ones of store instructions 150, such as a group identification value, an indication of a respective allocated physical register, and a program counter value indicating a memory address from which the respective store instruction 150 was fetched.

Method 300 continues in block 320 by preserving, in a particular entry of a store-load dependency (SLD) prediction circuit, information related to the particular store instruction. The information may include a first program counter value corresponding to the particular store instruction. As shown, store-load dependency circuit 101 is used by processor core 100 to identify store-load pairs that may be eligible for use with ZCL operations. When one of store instructions 150 (e.g., store instruction 150a) meets particular eligibility requirements, then an entry in a prediction circuit within store-load dependency circuit may be generated. Examples of fields that may be included in the entry are shown in FIGS. 2A-2C, and include a program counter value identifying store instruction 150a, as well as one or more indications that may be used to determine if a dependency to a load instruction has been established.

At block 330, method 300 continues by decoding, after the preserving, a particular load instruction for retrieving information from the memory hierarchy. For example, a subsequent load instruction, such as load instruction 160, is decoded after the entry in store-load dependency circuit 101 is generated. In some embodiments, load instruction 160 may be a first load instruction to be decoded after the entry is generated.

Method 300 continues in block 340 by determining whether a dependency has been established between the particular load instruction and the particular store instruction. If load instruction 160 meets eligibility requirements (e.g., it satisfies a distance limit to store instruction 150a) store-load dependency circuit 101 may evaluate load instruction 160 for a dependency to store instruction 150a. This dependency may be based on a second program counter value corresponding to load instruction 160 and the first program counter value from the particular entry. Store-load dependency circuit 101 tracks store and load instructions based on their respective program counter values. The entry generated when store instruction 150a is buffered includes the program counter value of store instruction 150. If store-load dependency circuit 101 has been trained to identify a dependency of load instruction 160 on store instruction 150a, then the program counter value for load instruction 160 is also included in the entry, thereby enabling the entry to be used to identify both store instruction 150a and load instruction 160 by their respective program counter values.

It is noted that the method of FIG. 3 includes elements 310-340. Method 300 may end in block 340 or may repeat some or all blocks of the method. For example, method 300 may return to block 310 in response to retrieving a next store instruction. In some cases, method 300 may be performed concurrently with other instantiations of the method. For example, a second store instruction may be buffered in the store queue circuit after the first store instruction and before the load instruction. In such a case, a second instantiation of method 300 (or a portion thereof) may be performed.

Figure 4:
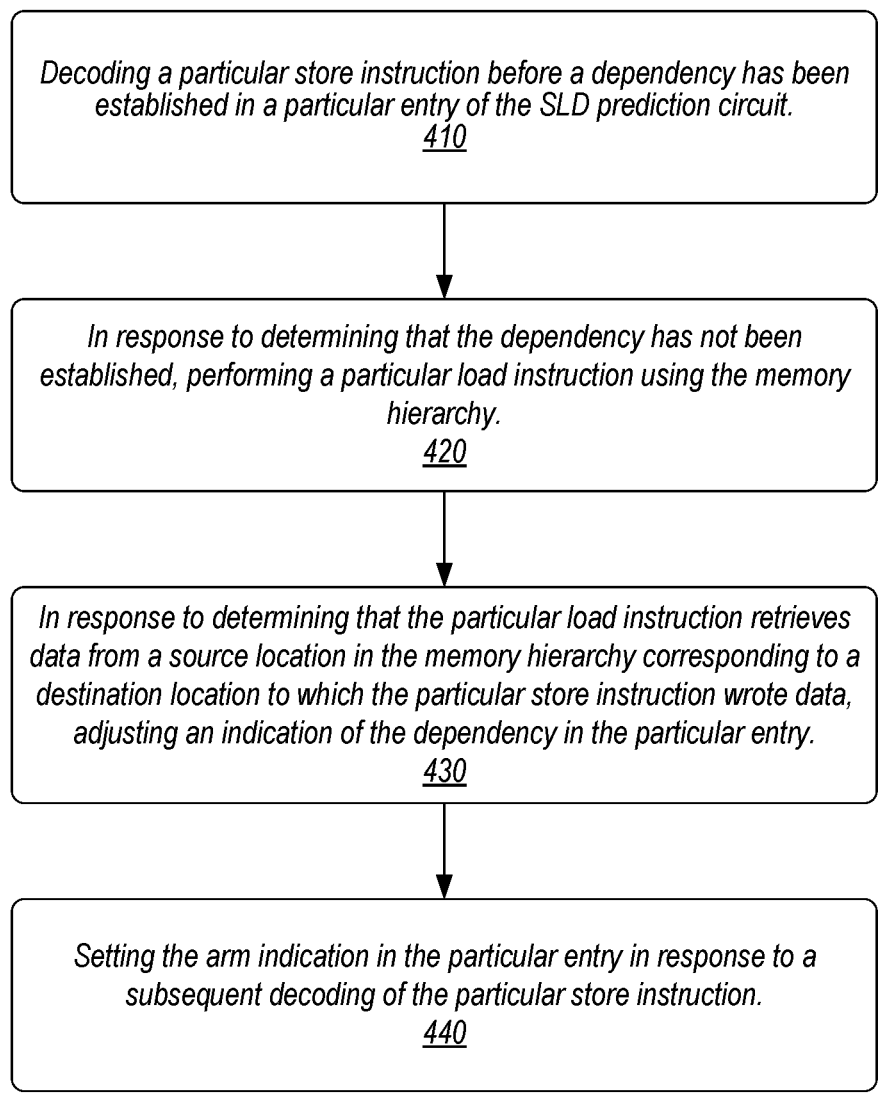
FIG. 4 illustrates a flow diagram of an embodiment of a method for determining a dependency between a store instruction and a load instruction.

Proceeding now to FIG. 4, a flow diagram for an embodiment of a method for training a store-load prediction circuit is illustrated. Similar to method 300, method 400 may be used in conjunction with any of the computer circuitry, systems, devices, elements, or components disclosed herein, such as processor cores 100 and 200. Method 400 is described below using system 290 of FIG. 2A as an example. References to elements in FIG. 2A are included as non-limiting examples.

As illustrated, method 400 begins in block 410 by, decoding a particular store instruction before a dependency has been established in a particular entry of a store-load dependency prediction circuit. As shown in FIG. 2A, store instruction 250 is decoded and placed into instruction buffer circuit 240. Entry 202c of store-load prediction circuit 202 within store-load dependency circuit 201 is accessed based on a program counter value (PC 227) for store instruction 250 (e.g., a hash code is generated using some or all of PC 227). In some cases, values associated with store instruction 250 may have already been stored in entry 202c. A strength count for the entry for entry 202c, however, may not have reached a threshold value for establishing a dependency between store instruction 250 and a subsequent load instruction. If, on the other hand, this is a first decoding of store instruction 250 (e.g., a first decoding after store-load dependency circuit 201 was reset), then entry 202c may be vacant/invalid and values corresponding to store instruction 250 are determined and stored in entry 202c. Since a dependency has not been established for store instruction 250, no entry in store-load mapper circuit 205 is generated in response to the decoding of store instruction 250.

In response to determining that the dependency has not been established, method 400 continues in block 420 by performing a particular load instruction using the memory hierarchy. As shown, load instruction 260 is decoded subsequent to store instruction 250. To determine whether a dependency has been established for load instruction 260, store-load mapper circuit 205 is accessed using a program counter value (PC 228) for load instruction 260. For example, a hash code is generated using some or all of PC 228 and the resulting code used to access a particular entry in store-load mapper circuit 205 (e.g., entry 205b). Since no dependency between load instruction 260 and store instruction 250 has been established, no entry in store-load mapper circuit 205 has been generated for use by load instruction 260. Accordingly, load instruction 260 is performed by issuing a memory request to memory hierarchy 270.

In response to determining that the particular load instruction retrieves data from a source location in the memory hierarchy corresponding to a destination location to which the particular store instruction wrote data, method 400 proceeds in block 430 by adjusting an indication of the dependency in the particular entry. Store instruction 250 is performed at a point in time when a store-load execution circuit has available bandwidth, and a value is written to a destination location in memory hierarchy 270. In the present example, load instruction 260 uses a source location that is the same as the destination location of store instruction 250. After determining that these source and destination locations are the same, the strength count for entry 202c in store-load prediction circuit is incremented. In other embodiments, however, it is contemplated that the strength count may be decremented.

Method 400 continues in block 440 by setting the arm indication in the particular entry in response to a subsequent decoding of the particular store instruction. The strength count of entry 202c provides an indication of a dependency between load instruction 260 and store instruction 250. Depending on the threshold for the strength count, performance of store instruction 250 and load instruction 260 may be repeated one or more additional times before the threshold is satisfied. Once the threshold has been satisfied, then subsequent decoding of store instruction 250 results in the generation of entry 205b in store-load mapper circuit 205. The arm indication is set to indicate that load instruction 260 may use a ZCL operation to receive the load data directly from the indicated physical register allocated to store instruction 250. This arm indication may be cleared after store instruction 250 issues to a store-load execution circuit. After store instruction 250 issues, the allocated physical register may be reallocated to a different decoded instruction, and therefore, may no longer contain the data from store instruction 250.

It is noted that method 400 includes elements 410-440. Method 400 may end in block 440 or may repeat some or all blocks of the method. For example, method 400 may repeat blocks 410 through 430 before the dependency is established in block 440. In a manner as described above for method 300, method 400 may be performed concurrently with other instantiations of the method. For example, a different store-load pair may be decoded before a dependency between load instruction 260 and store instruction 250 is established.

Moving to FIG. 5, a flow diagram for an embodiment of a method for performing a ZCL operation using a store-load dependency circuit is illustrated. In a similar manner as methods 300 and 400, method 500 may be used in conjunction with any of the computer circuitry, systems, devices, elements, or components disclosed herein, such as processor cores 100 or 200. Method 500 is described below using system 290 of FIG. 2B as an example. References to elements in FIG. 2B are included as non-limiting examples. In the present example, performance of method 500 occurs after completion of method 400.

As illustrated, method 500 begins in block 510 by decoding the particular store instruction after a dependency has been established in a particular entry of the store-load dependency prediction circuit. The portion of code that includes store instruction 250 and load instruction 260 may be repeated multiple times during code execution. As shown in FIG. 2B, store instruction 250 is again decoded and placed into instruction buffer circuit 240. Entry 202c of store-load prediction circuit 202 is again accessed based on PC 227. The arm indication in entry 202c indicates that a dependency for store instruction 250 has been established. The load PC field of entry 202c identifies load instruction 260 at PC 228 as the dependent load instruction.

In response to determining that the dependency has been established, method 500 continues in block 520 by using preserved information to generate a corresponding entry in a store-load dependency (SLD) mapper circuit. As illustrated, entry 205b in store-load mapper circuit 205 is generated in response to the decoding of store instruction 250 and the subsequent determination that a dependency has been established. Entry 205b may be selected based on the value of PC 228 in the load PC field of entry 202c. As described above, a hash code may be generated using some or all of PC 228 and the resulting hash code used to select entry 205b. Preserved information 255 is used to populate fields of entry 205b in store-load mapper circuit 205. Populated entry 205b includes preserved information 257 that includes an identification of physical register 282c that was allocated to store instruction 250 to hold a value to be stored to the memory hierarchy.

Method 500 continues in block 520 by using preserved information in the entry in the SLD mapper circuit to perform the particular load instruction. Since a dependency has been established between store instruction 250 and load instruction 260, a ZCL operation may be performed to fulfill load instruction 260 in place of issuing a memory request to memory hierarchy 270. The ZCL operation may include using preserved information 257 to perform load instruction 260 by assigning physical register 282c that is allocated to store instruction 250 to an instruction that is a consumer of a result of load instruction 260 (e.g., subtract instruction 2450). Performance of store instruction 250 results in a value held in physical register 282c being written to the destination location indicated by store instruction 250. The dependency between load instruction 260 and store instruction 250 is based on load instruction 260 indicating a source location that is the same as the destination address. Accordingly, the value held in physical register 282c is the value to be loaded by load instruction 260. By assigning physical register 282c to a consumer instruction of load instruction 260, load instruction 260 is effectively completed using zero instruction cycles, thereby increasing performance of processor core 200 and avoiding issuance of a memory request to memory hierarchy 270.

It is noted that method 500 includes elements 510-530. Method 500 may end in block 530, or some or all blocks of the method may be repeated. For example, method 500 may return to block 510 in response to a decoding of a different store instruction. In some cases, method 500 may be performed concurrently with other instantiations of itself or the other disclosed methods if, for example, the different store instruction is decoded before method 500 completes for load instruction 260.

Figure 6:
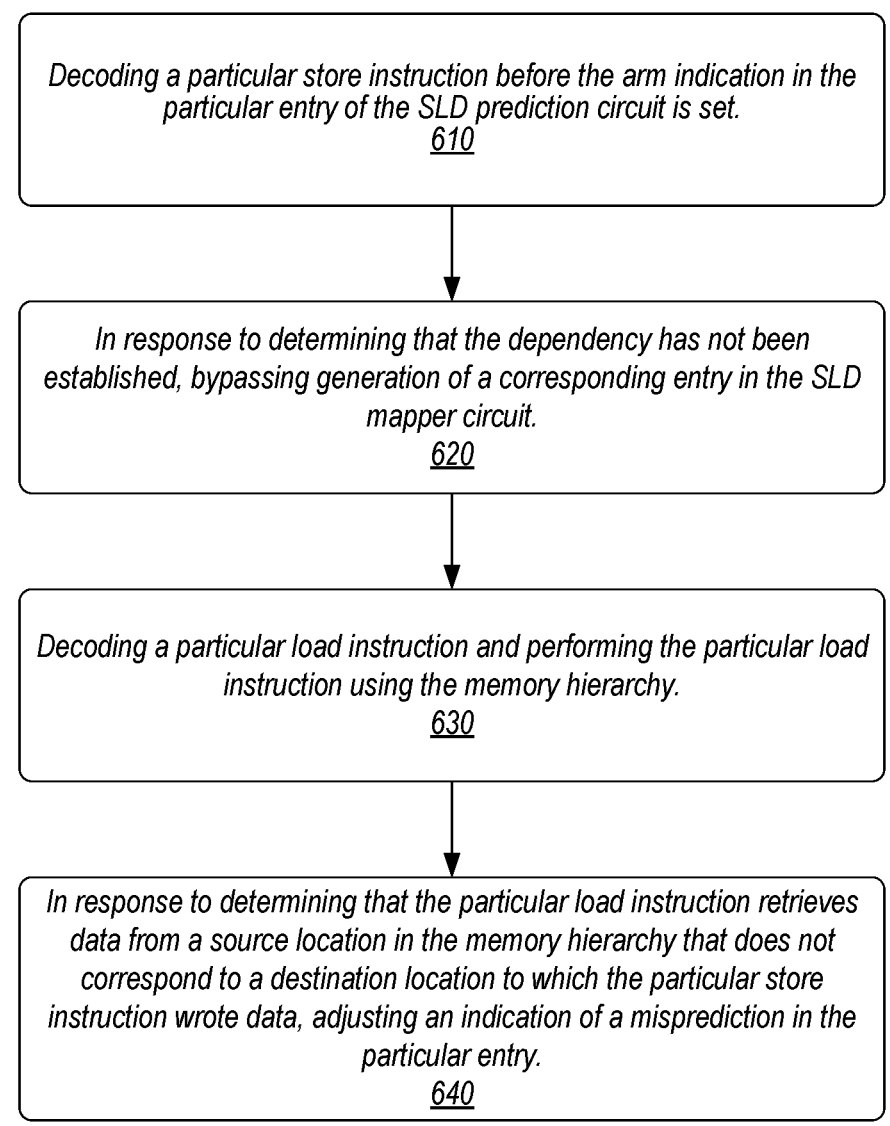
FIG. 6 depicts a flow diagram of an embodiment of a method for determining a mispredicted dependency between a store instruction and a load instruction.

Turning to FIG. 6, a flow diagram for an embodiment of a method for detecting a misprediction in a store-load dependency circuit is illustrated. Similar to other methods, method 600 may be used in conjunction with any of the computer circuitry, systems, devices, elements, or components disclosed herein, including, e.g., processor cores 100 and 200. Method 600 is described below using system 290 of FIG. 2A as an example. References to elements in FIG. 2A are included as non-limiting examples.

As shown, method 600 begins in block 610 by, decoding a particular store instruction before an arm indication in a particular entry of a store-load dependency (SLD) prediction circuit has been set to indicate that a dependency has been established. As shown in FIG. 2A, store instruction 250 is decoded and placed into instruction buffer circuit 240. As described above, entry 202c of store-load prediction circuit 202 is accessed based on a program counter value (PC 227) for store instruction 250. In the present example, values associated with store instruction 250 have been stored in entry 202c and a dependency to load instruction 260 is in process of being trained. A strength count for the entry for entry 202c, however, has not reached the threshold value for establishing a dependency between store instruction 250 and load instruction 260.

In response to determining that the dependency has not been established, method 600 continues in block 620 by bypassing generation of a corresponding entry in the SLD mapper circuit. As illustrated, a dependency has not been established for store instruction 250, therefore, no entry in store-load mapper circuit 205 is generated in response to the decoding of store instruction 250. Accordingly, a ZCL operation is not enabled for a subsequent performance of load instruction 260.

Method 600 continues in block 630 by decoding a particular load instruction and performing the particular load instruction using the memory hierarchy. As shown, load instruction 260 is decoded subsequent to store instruction 250. Since no dependency between load instruction 260 and store instruction 250 has been established, no entry in store-load mapper circuit 205 has been generated for use by load instruction 260. Accordingly, load instruction 260 is performed by issuing a memory request to memory hierarchy 270.

In response to determining that the particular load instruction retrieves data from a source location in the memory hierarchy that does not correspond to a destination location to which the particular store instruction wrote data, method 600 proceeds in block 640 by adjusting an indication of a misprediction in the particular entry. As depicted, performing store instruction 250 results in a value being written to a destination location in memory hierarchy 270. Load instruction 260, in this example, uses a source location that is different from the destination location of store instruction 250. After determining that these source and destination locations are different, a misprediction count for entry 202c in store-load prediction circuit 202 is incremented. In other embodiments, however, it is contemplated that the misprediction count may be decremented. If the misprediction count satisfies a threshold value, then entry 202c may be invalidated. In some embodiments, an indication may be set that identifies both store instruction 250 and load instruction 260 and prevents future attempts to train store-load prediction circuit 202 to identify a dependency between these instructions.

It is noted that method 600 includes elements 610-640. Method 600 may end in block 640 or may repeat some or all blocks of the method. For example, method 600 may return to block 610 in response to decoding of a different store instruction. Any of the disclosed methods 400 to 600 may be performed concurrently with other instantiations of itself or the other disclosed methods.

Figure 7:
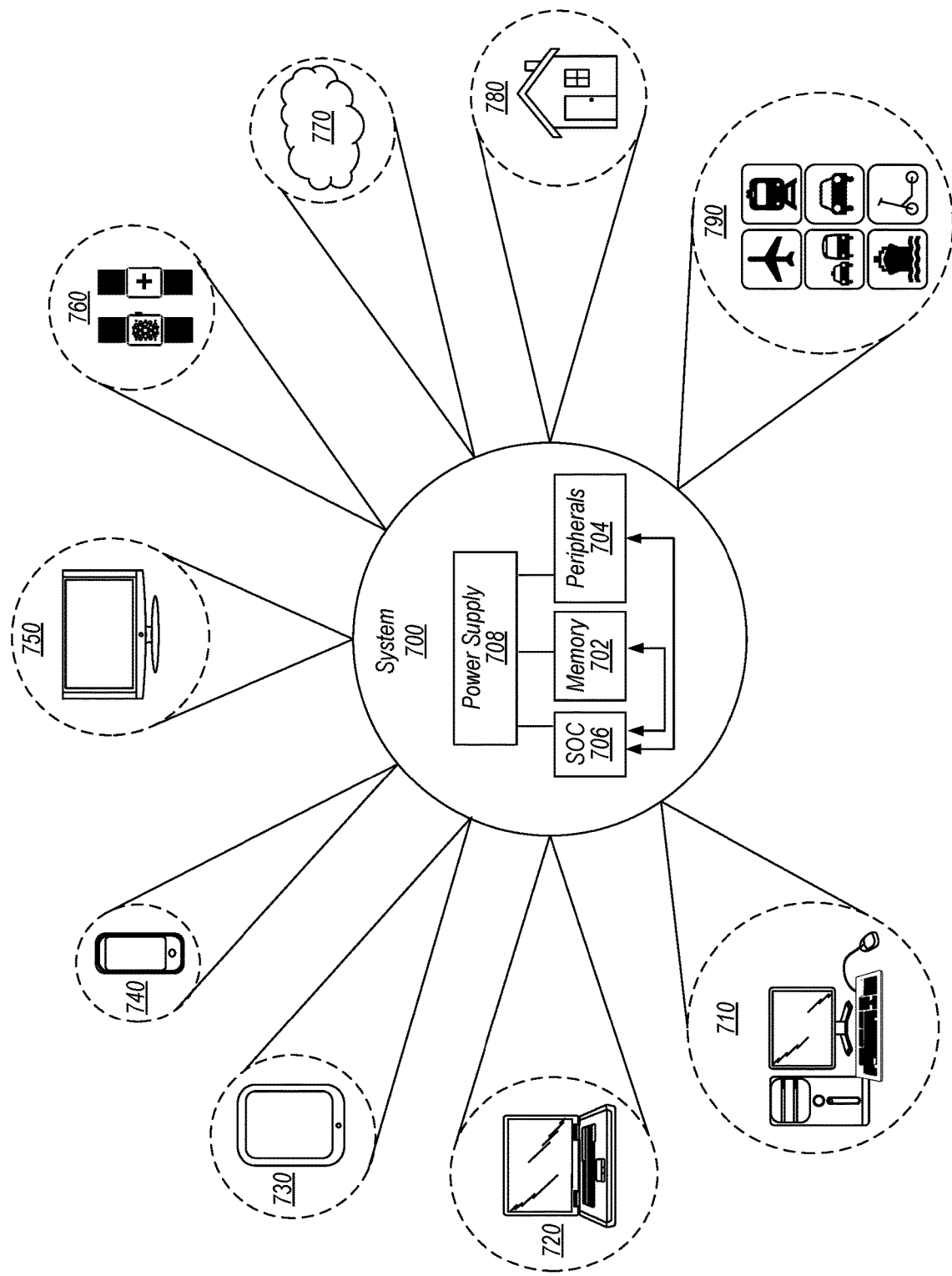
FIG. 7 illustrates various embodiments of systems that include integrated circuits that utilize the disclosed techniques.

FIGS. 1-6 illustrate circuits and methods for a system, such as an integrated circuit, that includes a store-load dependency circuit. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 700 is illustrated in FIG. 7. Computer system 700 may, in some embodiments, include any disclosed embodiment of processor core 100 in FIG. 1, or system 290 in FIGS. 2A-2C.

In the illustrated embodiment, the system 700 includes at least one instance of a system on chip (SoC) 706 which may include multiple types of processor circuits, such as a central processing unit (CPU), a graphics processing unit (GPU), or otherwise, a communication fabric, and interfaces to memories and input/output devices. One or more of these processor circuits may correspond to an instance of the systems disclosed herein. In various embodiments, SoC 706 is coupled to external memory circuit 702, peripherals 704, and power supply 708.

A power supply 708 is also provided which supplies the supply voltages to SoC 706 as well as one or more supply voltages to external memory circuit 702 and/or the peripherals 704. In various embodiments, power supply 708 represents a battery (e.g., a rechargeable battery in a smart phone, laptop or tablet computer, or other device). In some embodiments, more than one instance of SoC 706 is included (and more than one external memory circuit 702 is included as well).

External memory circuit 702 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 702 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration. External memory circuit 702 may be included in memory hierarchy 270, for example, as at least a portion of system memory circuit 275.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 760 are contemplated as well, such as devices worn around the neck, devices attached to hats or other headgear, devices that are implantable in the human body, eyeglasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home 780 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation 790. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise.

It is noted that the wide variety of potential applications for system 700 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 7 are illustrative only and are not intended to be limiting. Other devices are possible and are contemplated.

As disclosed in regards to FIG. 7, computer system 700 may include one or more integrated circuits included within a personal computer, smart phone, tablet computer, or other type of computing device. A process for designing and producing an integrated circuit using design information is presented below in FIG. 8.

Figure 8:
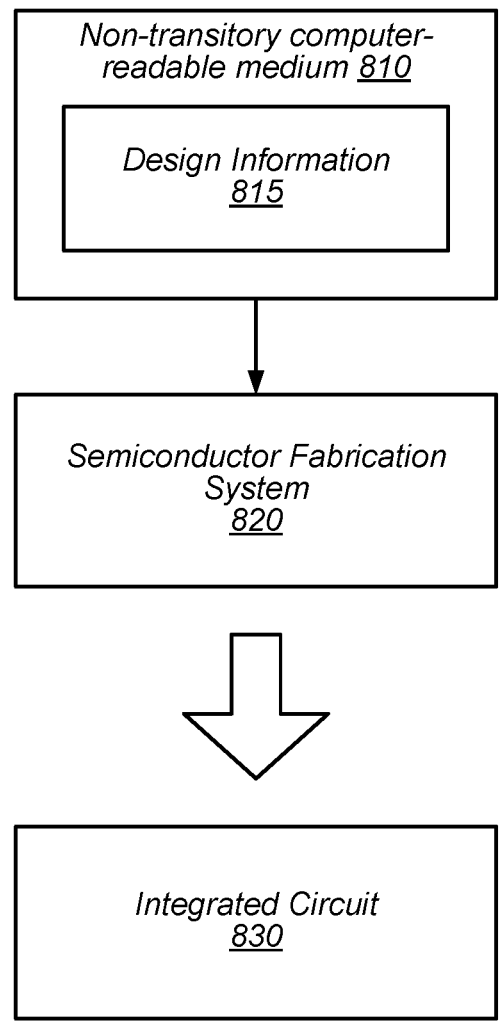
FIG. 8 is a block diagram of an example computer-readable medium, according to some embodiments.

FIG. 8 is a block diagram illustrating an example of a non-transitory computer-readable storage medium that stores circuit design information, according to some embodiments. The embodiment of FIG. 8 may be utilized in a process to design and manufacture integrated circuits, for example, including one or more instances of system 290 shown in FIGS. 2A-2C or processor cores 100 or 200. In the illustrated embodiment, semiconductor fabrication system 820 is configured to process the design information 815 stored on non-transitory computer-readable storage medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, System Verilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system, such as semiconductor fabrication system 820, for example. In some embodiments, design information 815 may include a netlist that specifies elements of a cell library, as well as their connectivity. One or more cell libraries used during logic synthesis of circuits included in integrated circuit 830 may also be included in design information 815. Such cell libraries may include information indicative of device or transistor level netlists, mask design data, characterization data, and the like, of cells included in the cell library.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown or described herein. Further, integrated circuit 830 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:
1. An apparatus comprising:
a processor core that includes:
an instruction decode circuit configured to decode instructions, including a plurality of store instructions used to store information in a memory hierarchy;
a store-load dependency (SLD) prediction circuit; and
a control circuit configured to:
after an initial decode of a particular store instruction by the instruction decode circuit, determine whether an entry is associated with the particular store instruction in the SLD prediction circuit;
based on a determination that no entry in the SLD prediction circuit has been associated with the particular store instruction, select a particular entry in the SLD prediction circuit to associate with the particular store instruction, wherein the selection is made before an initial decode of a load instruction that is dependent on the particular store instruction;
in response to a determination that the particular store instruction does not indicate a same architectural register as a subsequent load instruction, preserve, in the particular entry, information related to the particular store instruction, wherein the preserved store information includes a first program counter value corresponding to the particular store instruction;
in response to the initial decode, by the instruction decode circuit, of the dependent load instruction, determine whether a dependency has been established between the dependent load instruction and the particular store instruction, wherein the dependency determination is based on a second program counter value corresponding to the dependent load instruction and the first program counter value retrieved from the particular entry; and
in response to a determination that the dependency has been established, use the preserved store information from the particular entry to perform the dependent load instruction.

2. The apparatus of claim 1, wherein the control circuit is further configured to initialize a strength count in the particular entry in the SLD prediction circuit, wherein the strength count is indicative of a strength of the dependency of the dependent load instruction to the particular store instruction.

3. The apparatus of claim 2, wherein the control circuit is further configured, in response to a determination that the dependency has not been established, to:
perform the dependent load instruction using the memory hierarchy;
determine whether the dependent load instruction retrieves data from a source location in the memory hierarchy that corresponds to a destination location to which the particular store instruction wrote data; and
in response to a determination that the source and destination locations match, adjust, in the particular entry, a value of the strength count.

4. The apparatus of claim 1, further including a store-load dependency (SLD) mapper circuit, and
wherein the control circuit is further configured to:
access entries of the SLD prediction circuit using a program counter value of a decoded store instruction; and
access entries of the SLD mapper circuit using a program counter value of a decoded load instruction.

5. The apparatus of claim 4, wherein the control circuit is further configured, in response to another decoding of the particular store instruction after the dependency has been established, to:
use the preserved store information from the particular entry of the SLD prediction circuit to generate a corresponding entry in the SLD mapper circuit; and
store, in the corresponding entry in the SLD mapper circuit, an indication of a location of data to be stored by the particular store instruction.

6. The apparatus of claim 5, wherein the control circuit is further configured, in response to another decoding of the dependent load instruction after the corresponding entry in the SLD mapper circuit has been generated, to use the preserved store information from the corresponding entry to perform the dependent load instruction.

7. The apparatus of claim 5, wherein the control circuit is further configured, in response to a determination that a different load instruction is associated with the particular store instruction, to increment a misprediction count in the particular entry in the SLD prediction circuit.

8. The apparatus of claim 1, further including a plurality of physical registers; and
wherein the control circuit is further configured to assign a physical register that is allocated to the particular store instruction to an instruction that is a consumer of a result of the dependent load instruction.

9. A method, comprising:
decoding, by a processor core, a particular store instruction for storing information in a memory hierarchy;
based on determining that no entry of a store-load dependency (SLD) prediction circuit has been associated with the particular store instruction, select a particular entry to associate with the particular store instruction;
based on determining that the particular store instruction does not indicate a same architectural register as a subsequent load instruction, preserving, by the processor core in the particular entry, information decoded from the particular store instruction, wherein the information includes a first program counter value corresponding to the particular store instruction, and wherein the information is preserved in the particular entry of the SLD prediction circuit prior to a decode of a first instance of a particular load instruction that is dependent on the particular store instruction;
decoding, by the processor core after the preserving, the first instance of the particular load instruction for retrieving information from the memory hierarchy; and
determining, by the processor core, whether a dependency has been established between the particular load instruction and the particular store instruction, wherein the dependency is based at least on a second program counter value corresponding to the particular load instruction and the first program counter value from the particular entry.

10. The method of claim 9, further comprising, in response to determining that the dependency has been established, using the preserved information to perform the particular load instruction.

11. The method of claim 10, wherein using the preserved information to perform the particular load instruction includes:
identifying, based on the particular entry, a physical register that is allocated to the particular store instruction; and
reassigning the physical register to an instruction that is a consumer of a result of the particular load instruction.

12. The method of claim 9, further comprising, in response to determining that the dependency has not been established:
performing the particular load instruction using the memory hierarchy; and
in response to determining that the particular load instruction retrieves data from a source location in the memory hierarchy corresponding to a destination location to which the particular store instruction wrote data, adjusting an indication of the dependency in the particular entry.

13. The method of claim 12, further comprising:
in response to determining that the indication satisfies a threshold, using the preserved information in the particular entry of the SLD prediction circuit to generate a corresponding entry in a store-load mapper (SLM) circuit; and
setting an arm indication in the corresponding entry after a subsequent decoding of the particular store instruction.

14. The method of claim 9, further comprising, in response to a determination that the dependency has not been established:
performing the particular load instruction using the memory hierarchy; and
in response to determining that the particular load instruction retrieves data from a source location in the memory hierarchy that does not correspond to a destination location to which the particular store instruction wrote data, adjusting an indication of a misprediction in the particular entry.

15. A system, comprising:
a memory hierarchy including at least one cache memory circuit and at least one system memory circuit; and
a processor core circuit, coupled to the memory hierarchy, wherein the processor core circuit includes a store-load dependency (SLD) prediction circuit, and wherein the processor core circuit is configured to:
decode a first instance of a particular store instruction associated with a first program counter value;
identify, based on the first program counter value, whether an entry of the SLD prediction circuit is associated with the particular store instruction;
in response to a determination that no entry of the SLD prediction circuit has been associated with the particular store instruction, select a particular entry to associate with the particular store instruction, wherein the selection is made prior to a decode of a first instance of a particular load instruction that is dependent on the particular store instruction;
in response to a determination that the particular store instruction does not indicate a same architectural register as a subsequent load instruction, preserve, in the particular entry, information related to the particular store instruction, wherein the information includes the first program counter value corresponding to the particular store instruction;
decode the first instance of the particular load instruction after the information has been preserved; and determine whether a dependency has been established between the particular load instruction and the particular store instruction using the first program counter value in the particular entry and a program counter value corresponding to the particular load instruction.

16. The system off claim 15, wherein the processor core circuit is further configured to determine that the particular store instruction is not a stack push instruction in order to preserve the information related to the particular store instruction in the particular entry of the SLD prediction circuit.

17. The system off claim 15, wherein the processor core circuit is further configured to:
   determine that the particular load instruction and the particular store instruction result in a mispredicted dependency; and
   in response to the determined mispredicted dependency:
      invalidate the particular entry of the SLD prediction circuit; and
      set an indication in a misprediction table, wherein the indication identifies the particular load instruction and the particular store instruction.

18. The system off claim 17, wherein the processor core circuit is further configured, in response to a subsequent fetch of the particular store instruction, to prevent preserving, in the SLD prediction circuit, information related to the particular store instruction.

19. The system off claim 17, wherein the processor core circuit is further configured to:
   in response to the determined mispredicted dependency, increment a global misprediction count value; and
   in response to a determination that the global misprediction count value satisfies a threshold count value, disable the SLD prediction circuit.

* * * * *